United States Patent
Woo et al.

(10) Patent No.: US 8,278,786 B2
(45) Date of Patent: Oct. 2, 2012

(54) LINEAR VIBRATOR WITH AN INCREASED DRIVING FORCE

(75) Inventors: Ki-Suk Woo, Seoul (KR); Kyung-Ho Lee, Suwon-si (KR); Jun-Kun Choi, Suwon-si (KR); Yong-Jin Kim, Suwon-si (KR); Hwa-Young Oh, Seoul (KR); Je-Hyun Bang, Suwon-si (KR); Young-Bok Yoon, Yongin-si (KR); Suck-Jun Park, Suwon-si (KR); Kwang-Hyung Lee, Suwon-si (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 210 days.

(21) Appl. No.: 12/752,669

(22) Filed: Apr. 1, 2010

(65) Prior Publication Data

US 2011/0101799 A1 May 5, 2011

(30) Foreign Application Priority Data

Nov. 2, 2009 (KR) .................. 10-2009-0104773

(51) Int. Cl.
*H02K 33/00* (2006.01)
(52) U.S. Cl. ................. 310/15; 310/17; 310/36
(58) Field of Classification Search .............. 310/38, 310/15, 17, 25, 30, 36, 81, 21; *H02K 33/00, H02K 33/02, 35/00, 35/02, 7/065, 7/075, H02K 33/06*
See application file for complete search history.

(56) References Cited

U.S. PATENT DOCUMENTS

| | | | | |
|---|---|---|---|---|
| 7,911,098 | B2 * | 3/2011 | Lee et al. | 310/81 |
| 2011/0018364 | A1 * | 1/2011 | Kim et al. | 310/17 |
| 2011/0018365 | A1 * | 1/2011 | Kim et al. | 310/17 |
| 2011/0062803 | A1 * | 3/2011 | Lee et al. | 310/29 |

FOREIGN PATENT DOCUMENTS

| | | | |
|---|---|---|---|
| JP | 2002200460 A * | 7/2002 | |
| KR | 10-2007-0103174 | 10/2007 | |

OTHER PUBLICATIONS

KR Patent Office, Machine Translation, KR 1020070103174, Nov. 14, 2011, http://kposd.kipo.go.kr:8088/up/kpion/.*
JPO Machine Translation, JP 2002-200460, Vibration Actuator and Electronic Equipment Which Has Vibration Actuator, May 7, 2012.*
Korean Office Action issued in Korean Patent Application No. 10-2009-0104773, dated Mar. 9, 2011.

* cited by examiner

*Primary Examiner* — Quyen Leung
*Assistant Examiner* — Thomas Truong
(74) *Attorney, Agent, or Firm* — McDermott Will & Emery LLP

(57) ABSTRACT

A linear vibrator is disclosed. The linear vibrator in accordance with an embodiment of the present invention includes a base, a coil unit, which is coupled to the base, a magnet assembly, which forms a closed circuit of a magnetic force perpendicular to an electric current flowing through the coil unit and in which the magnet assembly relatively moves with respect to the coil unit, and an elastic member, which elastically supports the magnet assembly. Thus, a linear vibrator with an increased driving force can be provided by preventing the leakage of magnetic flux.

10 Claims, 8 Drawing Sheets

LINEAR VIBRATOR WITH AN INCREASED DRIVING FORCE

CROSS-REFERENCE TO RELATED APPLICATIONS

This application claims the benefit of Korean Patent Application No. 10-2009-0104773, filed with the Korean Intellectual Property Office on Nov. 2, 2009, the disclosure of which is incorporated herein by reference in its entirety.

BACKGROUND

1. Technical Field

The present invention is related to a linear vibrator.

2. Description of the Related Art

A vibration motor is a part that converts electrical energy into mechanical vibrations by using the principle of generating electromagnetic forces, and is commonly installed in a mobile phone to generate a soundless vibrating alert. With the rapid expansion of mobile phone markets and increased functionalities added to the mobile phone, mobile phone parts are increasingly required to be smaller and better. As a result, there has been an increased demand for the development of a new structure of vibration motor that can overcome the shortcomings of conventional vibration motors and effectively improve the quality.

As mobile phones having a bigger LCD screen have become popular for the past few years, there have been an increasing number of mobile phones adopting a touch-screen method, by which vibration is generated when the screen is touched. Touch-screens particularly require that the vibration motor has a greater durability due to a greater frequency of generating vibrations in response to the touch compared to the vibrations for incoming calls and that the vibration has a faster response to the touch made on the touch screen, in order to provide a user a greater satisfaction from sensing the vibration when touching the touch screen.

The conventional vibration motors commonly used in mobile phones generate a rotational force to cause mechanical vibrations by rotating an eccentric (unbalanced) weight. The rotational force is generated by supplying an electric current to the coil of a rotor through point contacts between a brush and a commutator by way of rectifying action.

However, the brush type structure using such commutator has a shorter motor life due to mechanical friction and electrical sparks, which cause wear and black powder, as the brush rubs between the segments of commutator when the motor rotates. Moreover, when voltage is supplied to the motor, it takes time to reach the target magnitude of vibrations by the rotational inertia of the motor. Thus, it is difficult to realize appropriate vibrations for touchscreen phones.

Commonly used to overcome the drawbacks of shorter life time and slower responsiveness in the vibrating functionality of touchscreen phones is a linear vibration motor, which does not use the principle of rotation of a motor but uses an electromagnetic force having a predetermined resonant frequency to generate vibrations by use of a spring installed in the vibration motor and a mass coupled to the spring. Here, the electromagnetic force is generated through an interactive reaction between a magnet, which is placed on the moving mass, and a direct or alternating current having a particular frequency flowing through a coil, which is placed on a stationary part.

The linear vibration motor commonly employed in a high-end touchscreen phone is placed generally near the corner of the mobile phone to generate the vibration in a direction perpendicular to the LCD screen. The linear vibration motor may have dimensions of 10 mm in external diameter and 4 mm in thickness. However, in the linear vibration motor, which is designed to vibrate in the perpendicular direction, the mass installed in the vibration motor is required to secure a vertical displacement within 4 mm of space so as to generate vibrations, so that the space limitation becomes much significant and increasing the amount of vibration may be restricted.

SUMMARY

The present invention provides a linear vibrator with an increased driving force by preventing the leakage of magnetic flux.

An aspect of the present invention provides a linear vibrator that includes a base, a coil unit, which is coupled to the base, a magnet assembly, which forms a closed circuit of a magnetic force perpendicular to an electric current flowing through the coil unit and in which the magnet assembly relatively moves with respect to the coil unit, and an elastic member, which elastically supports the magnet assembly.

The magnet assembly can include a center magnet, which is inserted into a hollow part, a side magnet, which is disposed on both sides of the coil unit, and a yoke, which supports the center magnet and the side magnet in such a way that a closed magnetic circuit is formed in between the center magnet and the side magnet.

The coil unit can have a hollow part formed therein and be supported by a bobbin formed on the base, and the center magnet can be inserted into the hollow part of the coil unit in such a way that the center magnet is movable horizontally.

The side magnet can be coupled to an inner or outer side of the yoke. If the side magnet is coupled to an outer side of the yoke, the side magnet can be provided as a plurality of side magnets.

The elastic member can be a plurality of spiral-shaped leaf springs, which are interposed between the magnet assembly and the base and in which the plurality of spiral-shaped leaf springs are deformed in a same direction. The spiral-shaped leaf spring can include a first frame, a plurality of plate-shaped members, which have one end part thereof coupled to an inner side of the first frame and the other end part thereof extended spirally toward a center of the first frame, and a second frame, which is coupled to the other end part of the plurality of plate-shaped members.

The plurality of spiral-shaped leaf springs can face one another and be coupled to one another about the second frame.

Additional aspects and advantages of the present invention will be set forth in part in the description which follows, and in part will be obvious from the description, or may be learned by practice of the invention.

DETAILED DESCRIPTION

Figure 1:
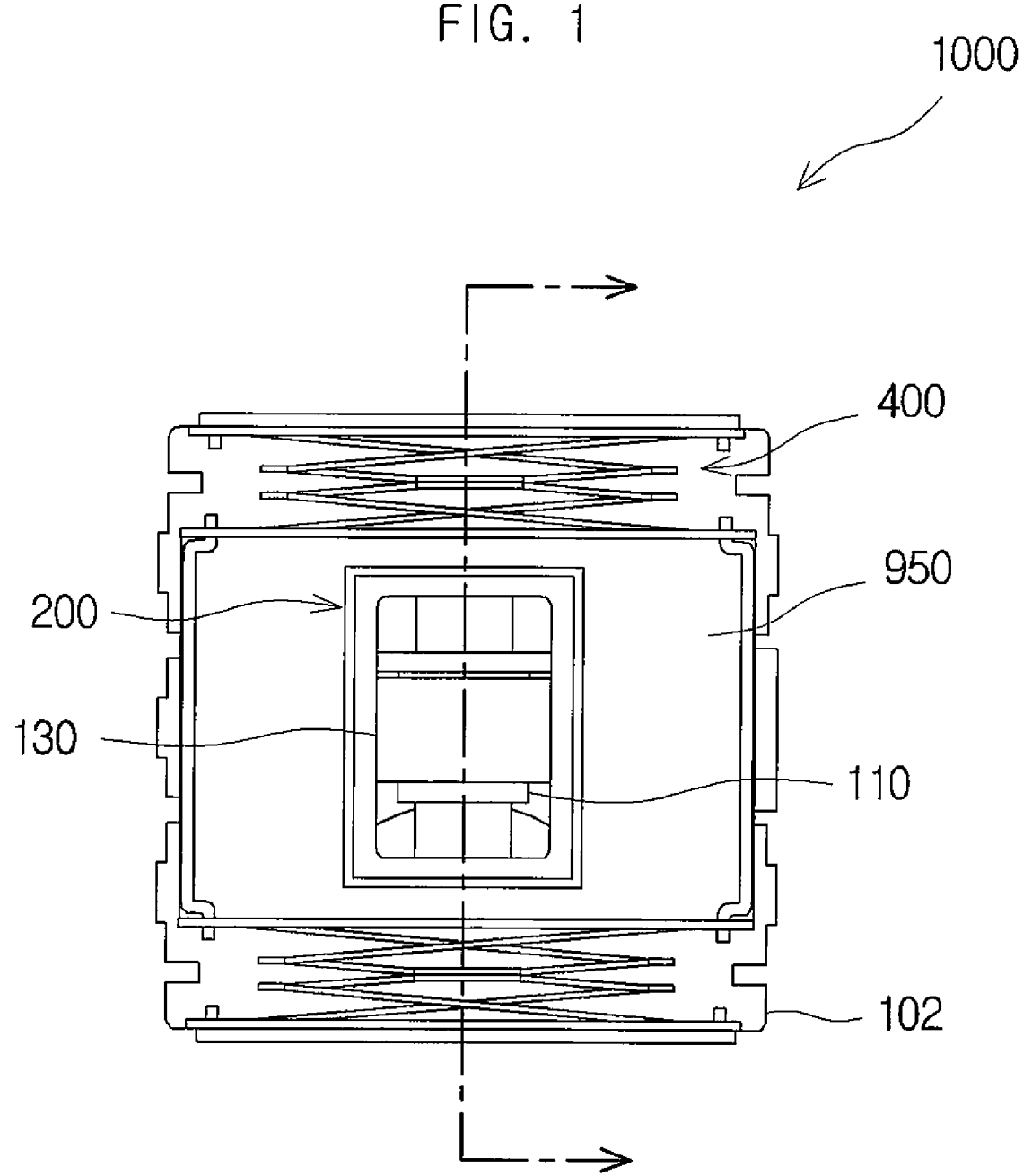
FIG. 1 is a plan view of a linear vibrator in accordance with an embodiment of the present invention.

The features and advantages of this invention will become apparent through the below drawings and description.

A linear vibrator according to certain embodiments of the present invention will be described below in more detail with reference to the accompanying drawings. Those components that are the same or are in correspondence are rendered the same reference numeral regardless of the figure number, and redundant descriptions are omitted.

Figure 2:
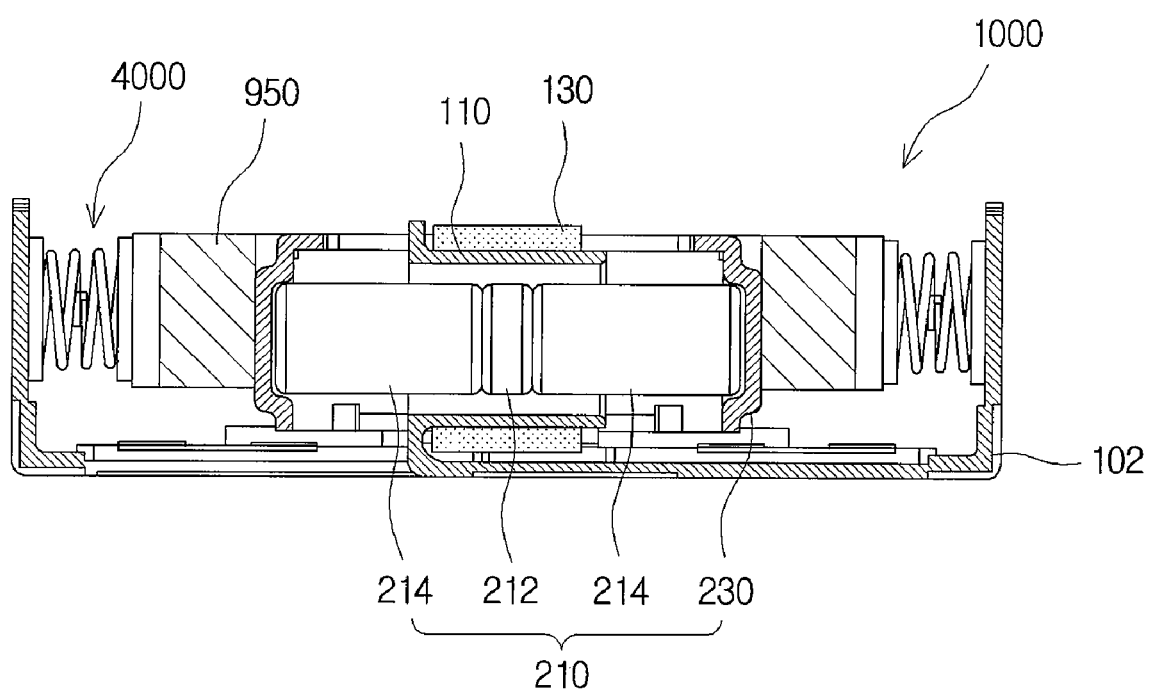
FIG. 2 is a cross-sectional view of a linear vibrator in accordance with an embodiment of the present invention.

FIG. 1 is a plan view of a linear vibrator in accordance with an embodiment of the present invention, and FIG. 2 is a cross-sectional view of a linear vibrator in accordance with an embodiment of the present invention. As illustrated in FIGS. 1 and 2, a linear vibrator 1000 in accordance with an embodiment of the present invention can prevent the leakage of magnetic flux caused by a magnet assembly 200 and generate an improved driving force.

The linear vibrator 1000 can include a base 102, a coil unit 130, a weight 950, a magnet assembly 200 and an elastic member 400. The base 102, in which the components of the linear vibrator 1000 are housed, has a space that supports the components of the linear vibrator 1000. A bobbin 110 can be formed at the center of the base 102.

The bobbin 110 is a part that can support the coil unit 130. The bobbin 110 can be arranged in the left-to-right direction of the base 102. The bobbin 110 can have a cylindrical shape having a hollow part 112 formed therein.

The coil unit 130 has a cylindrical shape having a hollow part formed therein, with a coil being wound on the cylindrical shape. By inserting the bobbin 110 into the hollow part of the coil unit 130, the coil unit 130 can be installed on the base 102.

Figure 3:
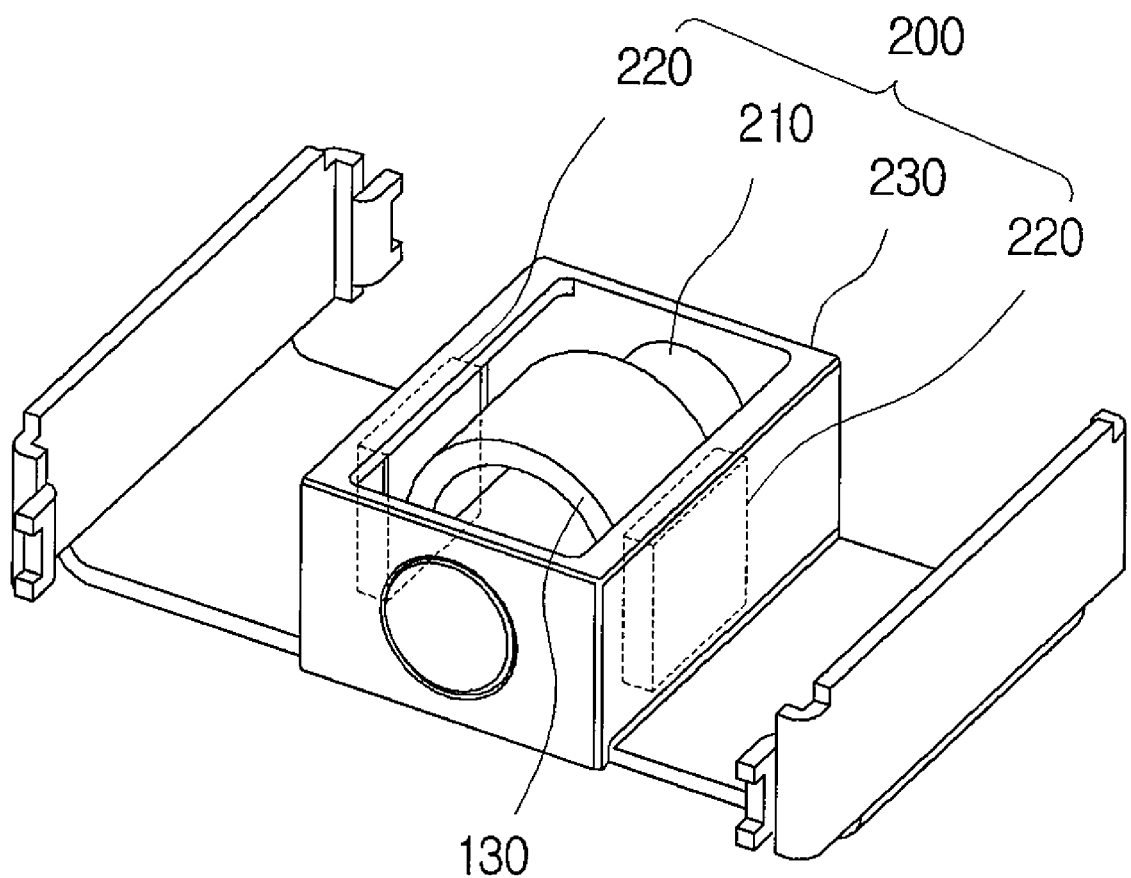
FIG. 3 is a perspective view illustrating a magnet assembly of a linear vibrator in accordance with an embodiment of the present invention.
Figure 4:
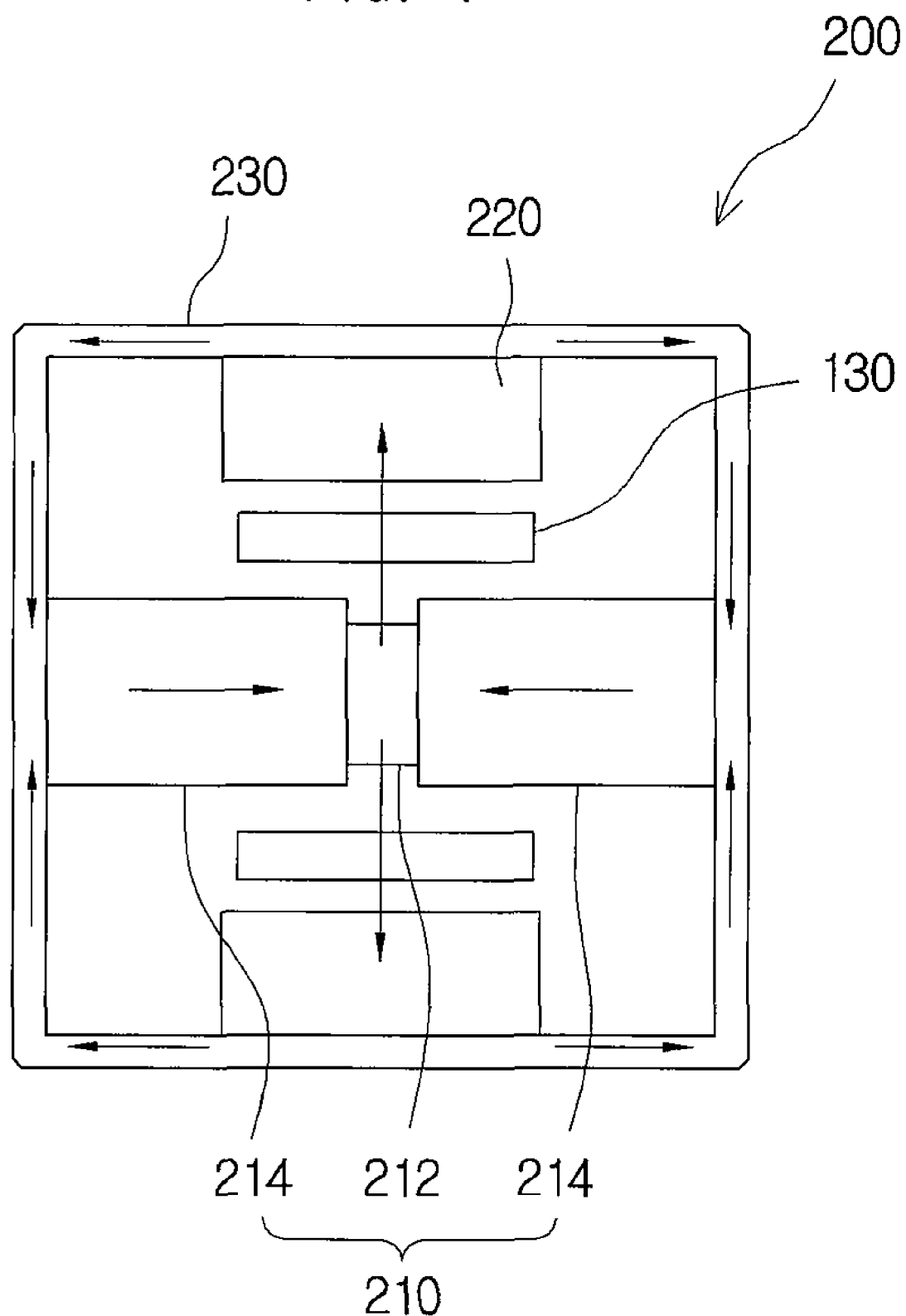
FIG. 4 is a plan view illustrating a closed magnetic circuit of a magnet assembly in a linear vibrator in accordance with an embodiment of the present invention.

FIG. 3 is a perspective view illustrating a magnet assembly of a linear vibrator in accordance with an embodiment of the present invention, and FIG. 4 is a plan view illustrating a closed magnetic circuit of a magnet assembly in a linear vibrator in accordance with an embodiment of the present invention.

As illustrated in FIGS. 3 and 4, the magnet assembly 200 can move relatively with respect to the coil unit 130 and form a closed circuit of a magnetic force perpendicular to an electric current flowing through the coil unit 130.

The magnet assembly 200 can include a center magnet 210, a side magnet 220 and a yoke 230. The center magnet 210 can be constituted by a cylinder-shaped magnet 214, which is disposed in such a way that a magnetic force line passes through the center thereof, and a core 212, which is interposed between at least two magnets 214. The center magnet 210 can be inserted into the bobbin 110 so that the center magnet 210 can move horizontally with respect to the base 102.

The side magnet 220 can be disposed on both sides of the coil unit 130. The side magnet 220 can be disposed in a direction toward both sides of the coil unit 130 from the center of the center magnet 210 so that the flux density of a magnetic force line passing through an outer surface of the coil unit 130 from the center of the center magnet 210 can be increased.

Although the present embodiment describes an example in which the side magnet 220 is disposed on both sides of the coil unit 130, it is also possible that the side magnet 220 can be disposed on an upper side and a lower side, as well as both sides, of the coil unit 130.

The yoke 230, in which a closed magnetic circuit is formed, can be made of a magnetic body that can prevent the leakage of magnetic flux.

The yoke 230 can have a shape that can support the center magnet 210 and the side magnet 220. A hollow part can be formed in the middle of the yoke 230, and either end of the center magnet 210 can be coupled to the hollow part. The side magnet 220 can be coupled to both ends of the inside of the hollow part.

Therefore, the magnet assembly 200 can form a closed magnetic circuit by use of the center magnet 210, the side magnet 220 and the yoke 230, thereby preventing the leakage of magnetic flux and increasing the driving force of the linear vibrator 1000. Also, the driving force of the linear vibrator 1000 can be further increased by increasing the flux density of the side magnet 220.

Therefore, a same driving force can be generated even though a smaller or thinner linear vibrator 1000 is used. This makes it possible to apply the linear vibrator 1000 in a smaller electronic device and reduce the power consumption.

As illustrated in FIGS. 1 to 3, the weight 950 can be shaped as a rectangular cuboid generally surrounding the yoke 300. The weight 950 is coupled to the magnet 200 and the yoke 300, and can generate greater vibrations through its repetitive horizontal movement together with the magnet 200.

Figure 5:
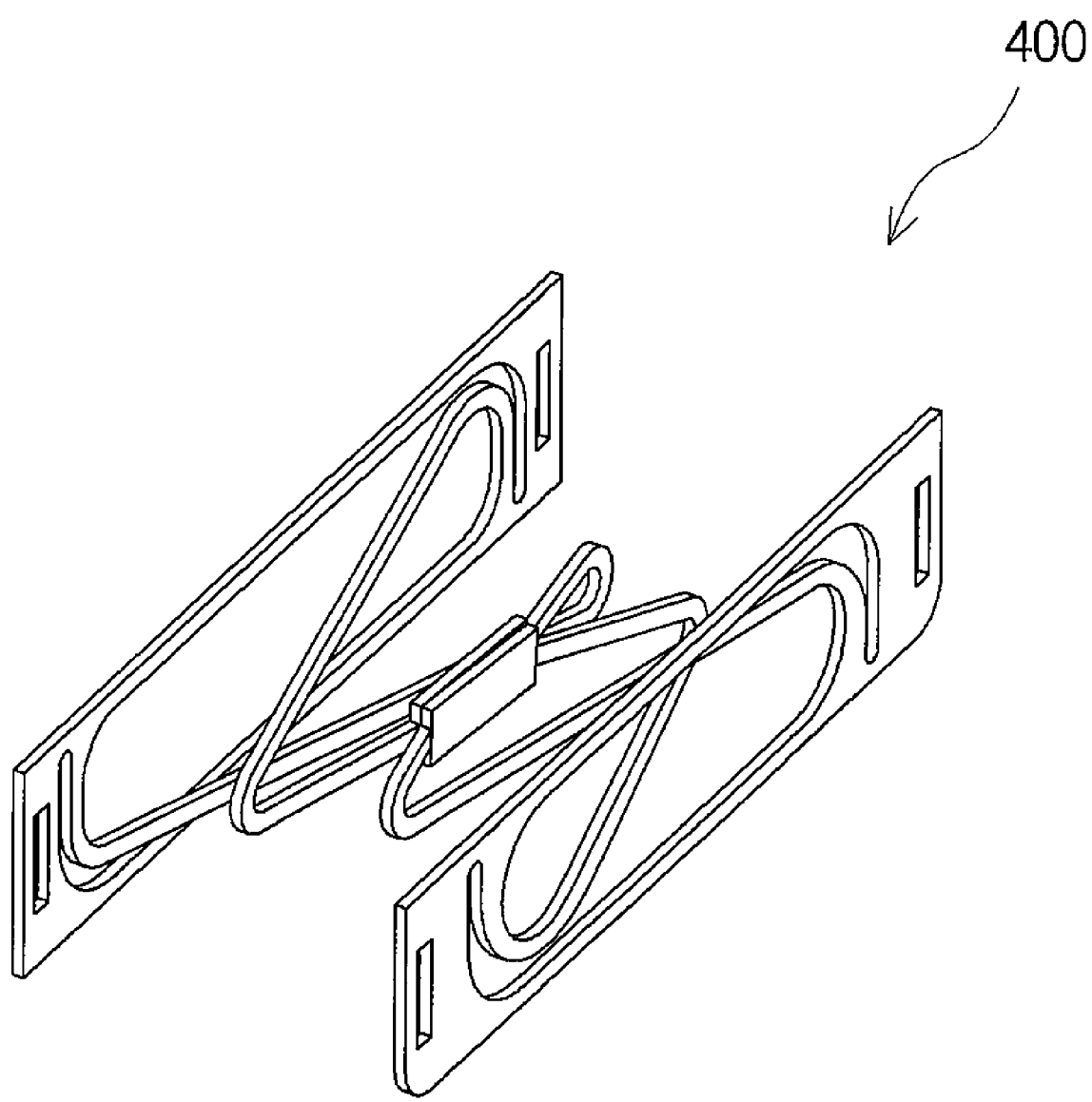
FIG. 5 is a perspective view illustrating an elastic member of a linear vibrator in accordance with an embodiment of the present invention.
Figure 6:
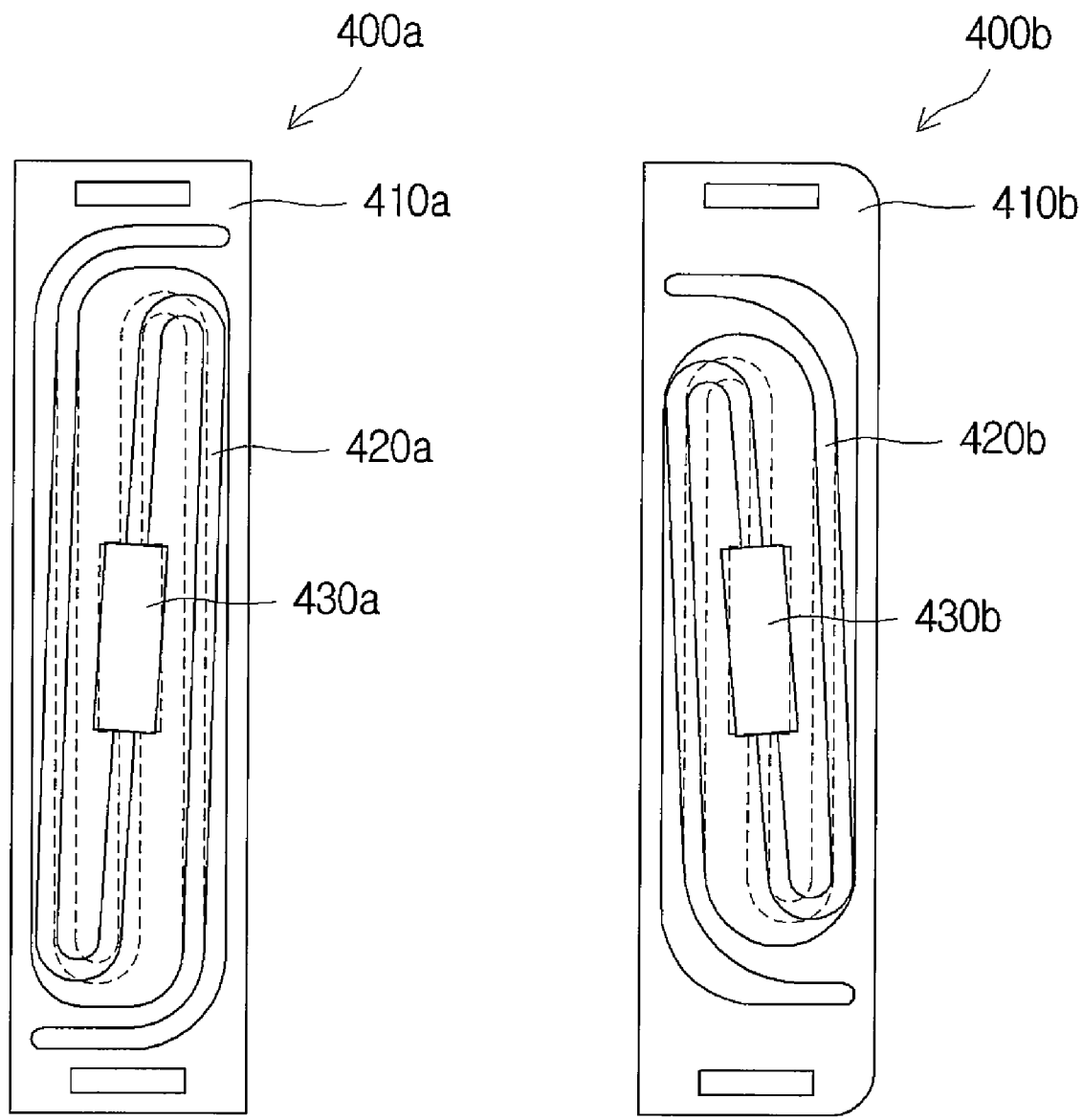
FIG. 6 is a plan view illustrating a spiral-shaped leaf spring of a linear vibrator in accordance with an embodiment of the present invention.

FIG. 5 is a perspective view illustrating an elastic member of a linear vibrator in accordance with an embodiment of the present invention, and FIG. 6 is a plan view illustrating a spiral-shaped leaf spring of a linear vibrator in accordance with an embodiment of the present invention.

As illustrated in FIGS. 5 and 6, the elastic member 400 has two spiral-shaped leaf springs 400a and 400b, which face each other and are coupled to each other. Each of the spiral-shaped leaf springs 400a and 400b includes a first frame 410a and 410b, a plate-shaped member 420a and 420b and a second frame 430a and 430b.

The first frames 410a and 410b have a rectangular shape corresponding to the cross section of the side of the linear vibrator 1000. The spiral-shaped leaf springs 400a and 400b have a rectangular shape and can be formed by way of pressing an elastic plate-shaped member.

The plate-shaped members 420a and 420b are positioned inside the first frames 410a and 410b. One end part of each of the plate-shaped members 420a and 420b is coupled to the inner side of the first frames 410a and 410b and extended spirally toward the center of the first frames 410a and 410b, respectively. Here, the plate-shaped members 420a and 420b can have a spiral shape extended toward a longer side of the first frames 410a and 410b in accordance with the shape of the first frames 410a and 410b.

Two plate-shaped members are extended from either side of the first frames 410a and 410b in such a way that the plate-shaped members 420a and 420b are symmetrically formed in the first frames 410a and 410b.

The plate-shaped members 420a and 420b are parts that actually provide the elasticity of the spiral-shaped leaf springs 400a and 400b. By having a spiral shape, the plate-shaped members 420a and 420b can have an extended form. Also, the modulus of elasticity of the spiral-shaped leaf springs 400*a* and 400*b* can be adjusted by modifying the length of the plate-shaped members 420*a* and 420*b*.

As illustrated in FIG. 6, the other end parts of the plate-shaped members 420*a* and 420*b* are coupled to both ends of the second frames 430*a* and 430*b*. The second frames 430*a* and 430*b* are parts where the end parts of the two plate-shaped members are coupled to each other, and can be supported elastically by the two plate-shaped members. In the present embodiment, the second frames 430*a* and 430*b* are parts that are in contact with each other when the spiral-shaped leaf springs 400*a* and 400*b*, facing each other, are coupled to each other.

By having the two spiral-shaped leaf springs 400*a* and 400*b* face each other and coupled to each other, the collective modulus of elasticity of the elastic member 400 can be smaller than that of each spiral-shaped elastic member 400.

Accordingly, the spiral-shaped leaf springs 400*a* and 400*b* having a greater modulus of elasticity can be used, and thus a wider variety of moduli of elasticity of the spiral-shaped leaf springs 400*a* and 400*b* can be selected when designing the linear vibrator 1000, ultimately improving the design freedom.

Furthermore, since the spiral-shaped leaf springs 400*a* and 400*b* having a greater modulus of elasticity can be used, thicker plate-shaped members 420*a* and 420*b* can be used. As a result, the stiffness of the plate-shaped members 420*a* and 420*b* can be increased, facilitating the process of manufacturing the spiral-shaped leaf springs 400*a* and 400*b*. Thus, it is easier to handle the leaf springs 400*a* and 400*b* during the manufacturing process, thereby effectively reducing the dispersion of the modulus of elasticity of the leaf springs 400*a* and 400*b*.

Also, since two spiral-shaped leaf springs 400*a* and 400*b* are used, the range of displacement that the elastic member 400 has can be increased so that the magnitude of vibration in the linear vibrator 1000 can also be increased.

Also, this arrangement reduces the range of displacement in each of the spiral-shaped leaf springs 400*a* and 400*b* so that the modulus of strain of the plate-shaped members 420*a* and 420*b* in the spiral-shaped leaf springs 400*a* and 400*b* can be decreased. As a result, the stresses within the plate-shaped members 420*a* and 420*b* can be decreased, and thus the life time of the spiral-shaped leaf springs 400*a* and 400*b* and the linear vibrator 1000 can be extended.

As illustrated in FIG. 6, when the spiral-shaped leaf springs 400*a* and 400*b* are deformed by an external force, the second frames 430*a* and 430*b* can be rotated in a particular direction. The two spiral-shaped leaf springs 400*a* and 400*b*, which face each other, can be coupled to each other in such a way that the second frames 430*a* and 430*b* can be rotated in a same direction when a deformation occurs.

With this arrangement, the elastic member 400 can prevent stresses within the plate-shaped members 420*a* and 420*b* that may otherwise occur due to the difference in rotating direction of the second frames 430*a* and 430*b* when the spiral-shaped leaf springs 400*a* and 400*b* are deformed. Then, while the elastic member 400 undergoes a displacement between an undeformed configuration and a deformed configuration, the second frames 430*a* and 430*b* of the spiral-shaped leaf springs 400*a* and 400*b* can be deformed in a same direction so that the first frames 410*a* and 410*b* are not rotated.

Therefore, while the elastic member 400 undergoes deformation, the first frames 410*a* and 410*b*, which are the end parts of the elastic member 400, can be prevented from rotating so that the weight 950 can travel straight during the vibration of the weight 950.

Figure 7:
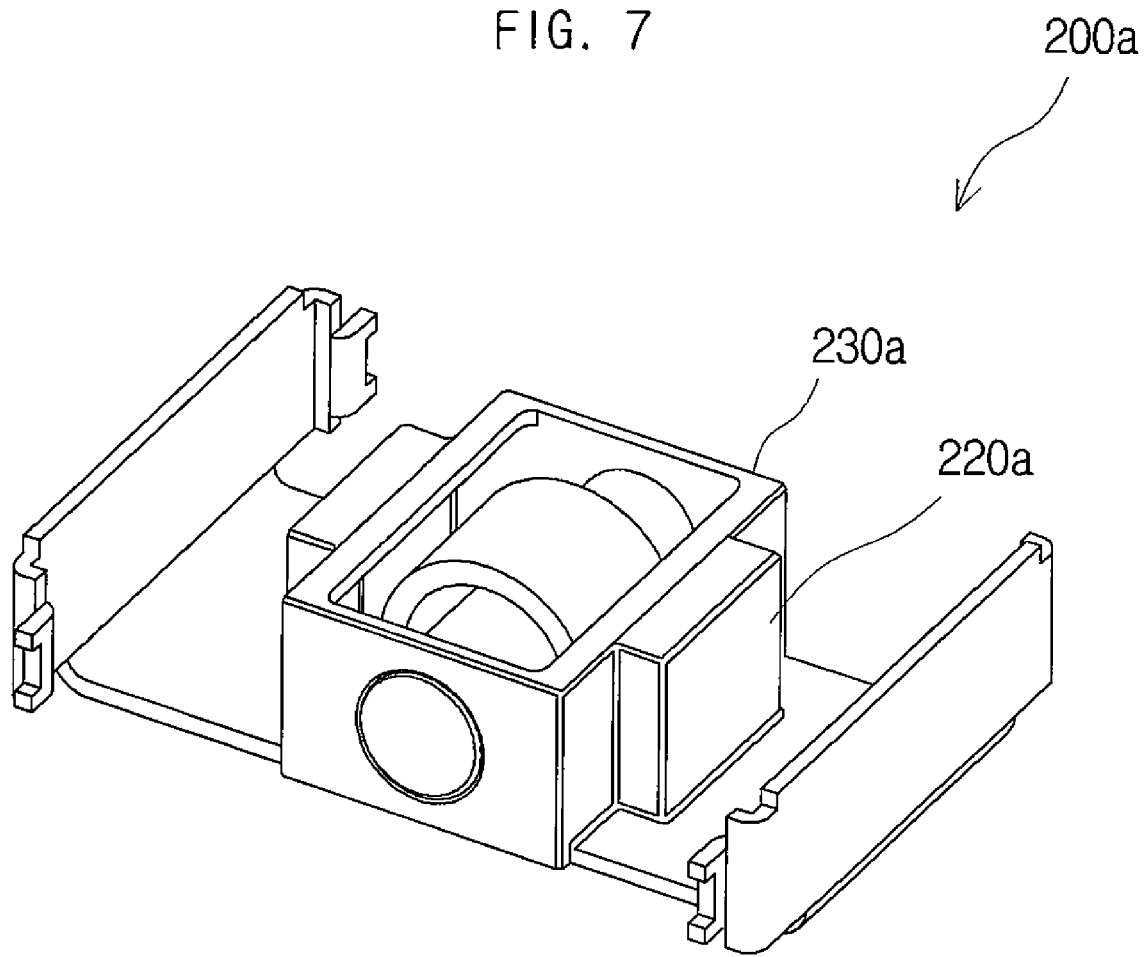
FIG. 7 is a perspective view illustrating a magnet assembly of a linear vibrator in accordance with another embodiment of the present invention.
Figure 8:
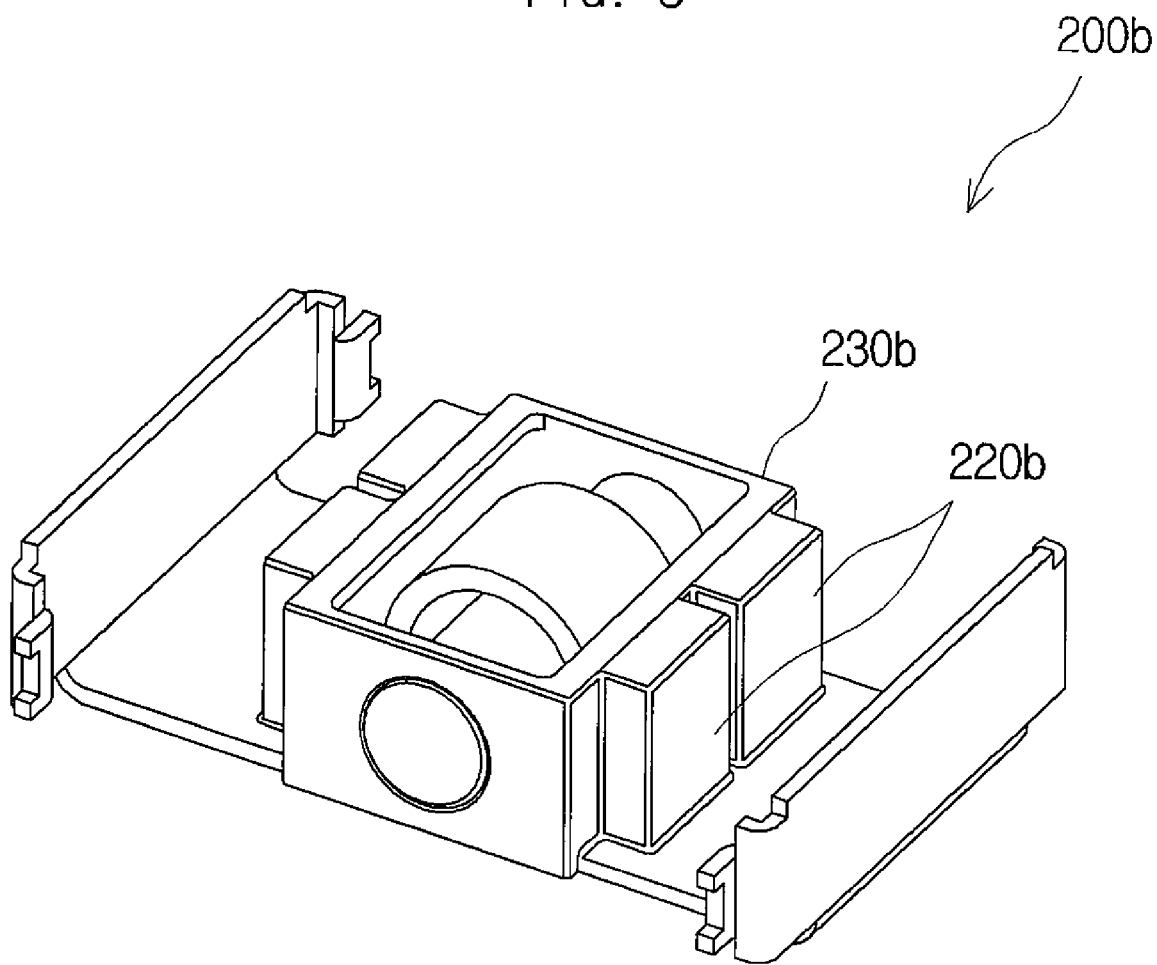
FIG. 8 is a perspective view illustrating a magnet assembly of a linear vibrator in accordance with yet another embodiment of the present invention.

FIG. 7 is a perspective view illustrating a magnet assembly 200*a* of a linear vibrator in accordance with another embodiment of the present invention, and FIG. 8 is a perspective view illustrating a magnet assembly 200*b* of a linear vibrator in accordance with yet another embodiment of the present invention. As illustrated in FIGS. 7 and 8, a side magnet 220*a* and 220*b* can be coupled to an outer side of a yoke 230*a* and 230*b* surrounding the center magnet. Here, a plurality of side magnets 220*b* can be installed so that the flux density can be increased.

By utilizing certain embodiments of the present invention, the leakage of magnetic flux can be prevented, thereby increasing the driving force of a linear vibrator.

While the spirit of the present invention has been described in detail with reference to particular embodiments, the embodiments are for illustrative purposes only and shall not limit the present invention. It is to be appreciated that those skilled in the art can change or modify the embodiments without departing from the scope and spirit of the present invention.

What is claimed is:

1. A linear vibrator, comprising:
   a base;
   a coil unit coupled to the base;
   a magnet assembly configured to form a closed circuit of a magnetic force perpendicular to an electric current flowing through the coil unit,
   the magnet assembly relatively moving with respect to the coil unit,
   the magnet assembly including a center magnet and a side magnet, the side magnet being positioned on both sides of the coil unit and disposed in a direction toward both sides of the coil unit from a center of the center magnet such that a flux density of a magnetic force line passing through an outer surface of the coil unit from the center of the center magnet is increased; and
   an elastic member elastically supporting the magnet assembly, wherein:
   the elastic member is a plurality of spiral-shaped leaf springs being interposed between the magnet assembly and the base, the plurality of spiral-shaped leaf springs being deformed in a same direction,
   each of the spiral-shaped leaf springs comprises:
   a first frame;
   a plurality of plate-shaped members having one end part thereof extended spirally toward an inner side of the first frame; and
   a second frame coupled to the other end part of the plurality of plate-shaped members, and
   the plurality of spiral-shaped leaf springs face one another and are coupled to one another about the second frame.

2. The linear vibrator of claim 1, wherein the magnet assembly comprises:
   a center magnet inserted into a hollow part; and
   a yoke supporting the center magnet and the side magnet in such a way that a closed magnetic circuit is formed in between the center magnet and the side magnet.

3. The linear vibrator of claim 2, wherein:
   the coil unit has a hollow part formed therein and is supported by a bobbin formed on the base; and
   the center magnet is inserted into the hollow part of the coil unit in such a way that the center magnet is movable horizontally.

4. The linear vibrator of claim 2, wherein the side magnet is coupled to an inner side of the yoke.

5. The linear vibrator of claim 2, wherein the side magnet is coupled to an outer side of the yoke.

6. The linear vibrator of claim 5, wherein the side magnet is provided as a plurality of side magnets.

7. A linear vibrator, comprising:
a base;
a coil unit coupled to the base;
a magnet assembly configured to form a closed circuit of a magnetic force perpendicular to an electric current flowing through the coil unit,
the magnet assembly relatively moving with respect to the coil unit,
the magnet assembly including a center magnet and a side magnet, the side magnet being positioned on both sides of the coil unit and disposed in a direction toward both sides of the coil unit from a center of the center magnet such that a flux density of a magnetic force line passing through an outer surface of the coil unit from the center of the center magnet is increased; and
an elastic member elastically supporting the magnet assembly.

8. The linear vibrator of claim 7, wherein the elastic member is a plurality of spiral-shaped leaf springs being interposed between the magnet assembly and the base, the plurality of spiral-shaped leaf springs being deformed in a same direction.

9. The linear vibrator of claim 8, wherein the spiral-shaped leaf spring comprises:
a first frame;
a plurality of plate-shaped members having one end part thereof extended spirally toward an inner side of the first frame; and
a second frame coupled to the other end part of the plurality of plate-shaped members.

10. The linear vibrator of claim 9, wherein the plurality of spiral-shaped leaf springs face one another and are coupled to one another about the second frame.

* * * * *